United States Patent Office 3,357,907
Patented Dec. 12, 1967

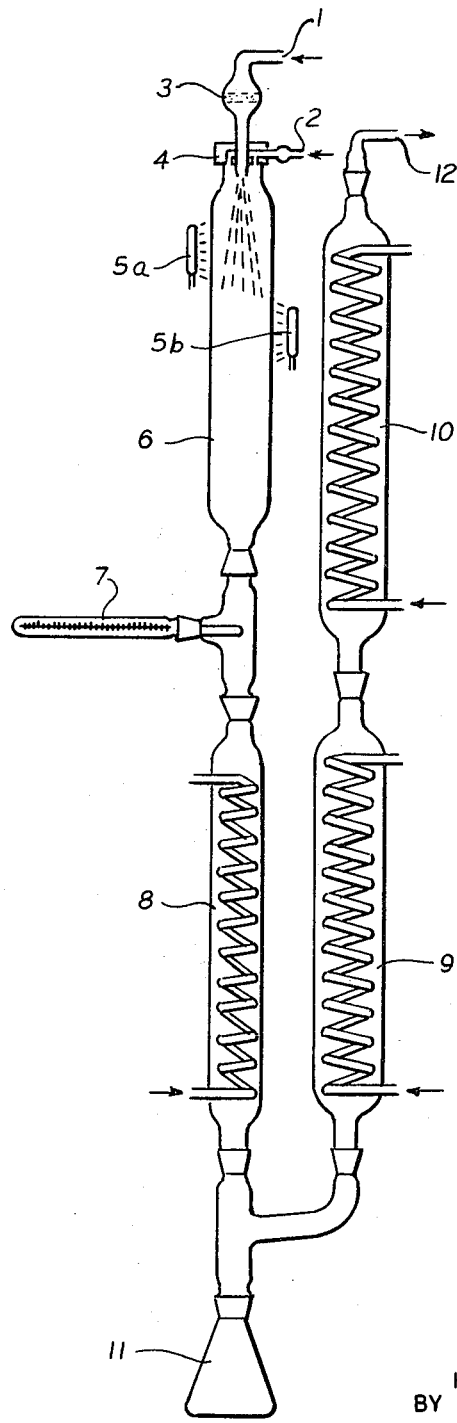

3,357,907
PROCESS FOR PREPARING 1,1,1-TRICHLOROETHANE
Paul Riegger, Bonn, and Hermann Richtzenhain, Cologne-Sulz, Germany, assignors to Dynamit Nobel Aktiengesellschaft, Troisdorf, Bezirk Cologne, Germany, a corporation of Germany
Filed Apr. 7, 1965, Ser. No. 446,208
Claims priority, application Germany, June 10, 1964, D 44,651
6 Claims. (Cl. 204—163)

ABSTRACT OF THE DISCLOSURE

A process for preparing 1,1,1-trichloroethane by photochemical chlorination of 1,1-dichloroethane.

It is known that 1,1,1-trichloroethane can be prepared by addition of hydrogen chloride to 1,1-dichloroethylene. It has also been proposed to produce 1,1,1-trichloroethane by chlorination of 1,1-dichloroethane or of a mixture of 1,1-dichloroethane and ethyl chloride, at elevated temperatures. A still further proposal for producing 1,1,1-trichloroethane involves the photo-chlorination of 1,1-dichloroethane to 1,1,1-trichloroethane. None of the aforementioned methods have, however, proved to be completely satisfactory. The first-mentioned process requires the use of the relatively expensive 1,1-dichloroethylene and is, therefore, uneconomical for most applications. When a thermal chlorination of 1,1-dichloroethane is carried out according to French Patent 1,304,821, there are obtained, in addition to the 1,1,1-trichloroethane, a large quantity of by-products. The main disadvantage of this method is the high reaction temperature which causes the chlorinated ethane to undergo decomposition whereby carbon is separated out, thus requiring periodic cleaning and servicing of the reactor. Furthermore, if this method is used the ratio of chlorine to 1,1-dichloroethane is restricted to the range of 0.25 and 0.40, which means that only a moderate conversion can be achieved and, in addition, that a costly separation of the starting material and the reaction product has finally to be carried out. Similar conditions prevail when the method of producing 1,1,1-trichloroethane from vinylchloride as described in French Patent 1,309,877 is employed. In this latter method the 1,1-dichloroethane formed as an intermediate product is also chlorinated at higher temperatures.

In United States Patent No. 3,019,175 there is described a method for the production of 1,1,1-trichloroethane wherein 1,1-dichloroethane is chlorinated at low temperature in liquid phase under exposure to light with the simultaneous use of sulfur-containing compounds and preferably carbon disulfide. However, the use of such catalysts has considerable disadvantages, the most important of which is that even very small amounts of sulfur impair the usefulness of 1,1,1-trichloroethane produced in this manner.

The object of this invention is a new and improved method for the preparation of 1,1,1-trichloroethane.

Another object of this invention is the provision of a process whereby the photo-chemical chlorination of 1,1-dichloroethane can be practically effected.

The foregoing and other objects, which will be manifest to the skilled in the art from the following description, are realized in accordance with the invention where it has now been found that these objects are accomplished and 1,1-dichloroethane is chlorinated to produce good yields of 1,1,1-trichloroethane by irradiating with light a mixture of chlorine and 1,1-dichloroethane. The process of this invention is carried out by introducing the 1,1-dichloroethane in liquid form and the required amount of chlorine into a suitable reaction vessel which is then exposed to light, e.g., visible or ultra-violet light. The method of the invention has the advantage that the amount of heat which is set free during the chlorination amounting to approximately 24 Kcal./mol. of reacted chlorine is used up for the major part for the vaporization of the 1,1-dichloroethane which has been introduced into the reaction vessel in liquid form. Thus, there is avoided any undesirable temperature increase in the reactor and, as a result, any decomposition of the chlorinated hydrocarbons present. The apparatus employed in carrying out the process of the invention is extremely simple and substantially trouble-free in operation.

The ratio of chlorine to 1,1-dichloroethane to be used in the process of the invention may be varied over a relatively large range. Preferably ratios of between 0.4 and 0.6 are used. If such a ratio is maintained, at least 80% of the converted 1,1-dichloroethane is obtained in the form of 1,1,1-trichloroethane.

The reaction temperature should be maintained at a point between the boiling point of the 1,1-dichloroethane and approximately 200° C. If higher reaction temperatures are used, increasing amounts of by-products are obtained. Preferably, reaction temperatures of between 90 and 170° C. should be utilized. If the photo-chlorination is carried out under moderate excess pressure, the temperature limits can be shifted in an upward direction.

The advantages of the invention are particularly apparent from a comparison of the photo-chlorination as carried out in accordance with the invention, with the photo-chlorination reactions conducted in the liquid phase or in the gaseous phase without introducing liquid 1,1-dichloroethane into the reaction vessel as taught herein. The results of the various photochlorinations are set out in the following table.

The apparatus which was employed in runs 10–13 corresponding to the process of the invention is shown in the drawing. The apparatus consisted of a vertically-arranged reaction tube 6 having a length of 300 mm. and a diameter of 50 mm. At the uppermost end of the reaction tube 6 an attachment 1 made of nickel is flange-connected. In the center of this attachment a Schlick rotary nozzle 3 having 0.15 mm. openings is provided for introducing the 1,1-dichloroethane. Concentrically arranged with respect to the nickel attachment 1 is a ring opening 4 for the admission of the chlorine. The lowermost end of the tubular reactor 6 is connected by a cooler 8 with a receptacle 11, which is equipped with a stripping cooler for the waste gas. Two UV-lamps 5a and 5b were mounted on the outside at approximately the mid portion but at a distance of 2–3 cm. from the tubular reactor 6. Laboratory immersion lamps were used as UV-light sources. The same consisted of Hg quartz lamps with 80 watt burners and had a 20 mm. burner length. At the exit of the reactor 6, a temperature gauge 7 was located. Under a constant pre-pressure of 7 atmospheres absolute pressure, approximately 1.2 liters of 1,1-dichloroethane per hour were introduced through the attachment 1 into the reactor at a temperature of 20° C. At the same time, varying amounts of chlorine were constantly introduced through a rotameter 2 under the pressure required for the particular flow.

The dichloroethane was introduced into the reactor in the form of a fine mist at an angle of approximately 20–30°. The chlorine which was introduced by itself was not sufficient for the gaseous phase required to effect the dispersion so that reactive gaseous phase refluxed from the higher temperatures, causing an intensive heat exchange. Reaction took place immediately, and within minutes the liquid phase which had existed with the introduction of the dichloroethane completely disappeared. The reaction product was discharged from the reactor in gaseous form and the temperature increased to a permanent or constant value.

The reaction product was condensed in the subsequently arranged coolers (coolers 8 and 9) were each operated with a cooling liquid of 10° C., and cooler 10 was operated with a cooling liquid of −20° C.). The condensed reaction product was passed from the coolers into receptacle 11 and was siphoned off from there continuously.

The separation of the 1,1,1-trichloroethane from the reaction product was carried out in the conventional manner, i.e., by distillation, and the unconverted 1,1-dichloroethane was recycled to the reactor. The HCl which was formed was taken off at outlet 12.

light of two fluorescent bulbs having a maximum emission of light at about 3600 A., each contained in a reflector fixture placed at a distance of about 2″ from the reactor tube. The chlorination of the 1,1-dichloroethane takes place essentially completely without decomposition of the chlorinated hydrocarbon starting materials or reaction products.

We claim:

1. Process of preparing 1,1,1-trichloroethane, which comprises introducing gaseous chlorine into a reaction zone, passing 1,1-dichloroethane as a liquid into said reaction zone wherein said liquid 1,1-dichloroethane is initially brought into contact with said gaseous chlorine and is converted into gaseous 1,1-dichloroethane, irradiating said gaseous reaction mixture with light having a wave length within the visible to ultraviolet range, and recovering the 1,1,1-trichloroethane thereby produced.

TABLE

| Run No. | Procedure | Temp. (° C.) | Mol Ratio Cl₂/ 1,1-Dichloroethane | Percent Conversion of 1,1-Dichloroethane | Percent Yield of 1,1,1-Trichloroethane from 1,1-Dichloroethane | Higher Chlorinated By-Products |
|---|---|---|---|---|---|---|
| 1 | Liquid phase chlorination | 20–30 | 0.451 | 41.9 | 69.6 | 30.4 |
| 2 | do | 20–30 | 0.578 | 52.0 | 68.7 | 31.3 |
| 3 | do | 57 | 0.248 | 23.9 | 69.8 | 30.2 |
| 4 | do | 57 | 0.485 | 44.5 | 68.2 | 31.8 |
| 5 | do | 57 | 0.566 | 50.7 | 67.8 | 32.2 |
| 6 | Gas phase chlorination | 196 | 0.204 | 19.7 | 79.1 | 20.9 |
| 7 | do | 253 | 0.443 | 41.9 | 76.2 | 23.8 |
| 8 | do | 280 | 0.505 | 47.1 | 74.4 | 25.6 |
| 9 | do | 306 | 0.660 | 60.1 | 72.9 | 27.1 |
| 10 | Gas phase chlorination with introduction of liquid 1,1,1-chloroethane in accordance with the invention. | 95 | 0.396 | 38.0 | 83.0 | 17.0 |
| 11 | | 102 | 0.444 | 42.4 | 82.4 | 17.6 |
| 12 | | 118 | 0.518 | 49 | 80.8 | 19.2 |
| 13 | | 160 | 0.689 | 63.9 | 78.6 | 21.4 |

The process of this invention is effective when the chlorination system is exposed to light of wave length between 2500 and 7000 A., preferably, light of 3000 A.–5000 A. Sources of light which are particularly useful include sunlight, mercury arcs, fluorescent light bulbs with special phosphors having maximum emission in the ultraviolet, and sun lamps of the type having both tungsten filaments and mercury arcs which emit light in essentially all wave lengths down to 3000 A.

The reaction vessels employed in carrying out the process of this invention are required to be transparent to light as the sources of light are externally located. The reaction vessels suitable for use in accordance with the invention are conveniently made of chemically-resistant glass of the borosilicate type, such as "Pyrex." Thus, for example, a Pyrex glass reaction tube is charged with the chlorine and 1,1-dichloroethane as set out above, and the tube and its contents are exposed to the light from a source such as a UV-lamp or fluorescent lamp, as, for instance, the tube and its contents are exposed to the 2. Process according to claim 1, wherein said light has a wave length of from 2500–7000 A.

3. Process according to claim 1, wherein said light has a wave length of from 3000–5000 A.

4. Process according to claim 1, which comprises employing a ratio of chlorine to 1,1-dichloroethane of from 0.4 to 0.6.

5. Process according to claim 1, which comprises maintaining the reaction temperature within the range between the boiling point of 1,1-dichloroethane and 200° C.

6. Process according to claim 1, which comprises maintaining the reaction temperature of from 90–170° C.

References Cited

UNITED STATES PATENTS 2,621,153  12/1952  Meyer et al. _____ 204—163
3,019,175  11/1962  Haefner et al. _____ 204—163

HOWARD S. WILLIAMS, *Primary Examiner.*